US012192723B2

(12) United States Patent
Margalit

(10) Patent No.: US 12,192,723 B2
(45) Date of Patent: *Jan. 7, 2025

(54) TECHNIQUES FOR GENERATING AUDIO SIGNALS

(71) Applicant: SONICEDGE LTD., Shoham (IL)

(72) Inventor: Mordehai Margalit, Zichron Yaaqov (IL)

(73) Assignee: SONICEDGE LTD., Shoham (IL)

(*) Notice: Subject to any disclaimer, the term of this patent is extended or adjusted under 35 U.S.C. 154(b) by 0 days.

This patent is subject to a terminal disclaimer.

(21) Appl. No.: 18/217,652

(22) Filed: Jul. 3, 2023

(65) Prior Publication Data

US 2023/0353943 A1 Nov. 2, 2023

Related U.S. Application Data

(63) Continuation of application No. 17/729,310, filed on Apr. 26, 2022, now Pat. No. 11,743,650, which is a continuation of application No. 17/060,277, filed on Oct. 1, 2020, now Pat. No. 11,323,816.

(60) Provisional application No. 62/952,480, filed on Dec. 23, 2019.

(51) Int. Cl.

*H04R 7/08* (2006.01)
*H04R 17/00* (2006.01)
*H04R 19/02* (2006.01)

(52) U.S. Cl.

CPC ............... *H04R 7/08* (2013.01); *H04R 17/00* (2013.01); *H04R 19/02* (2013.01); *H04R 2217/03* (2013.01)

(58) Field of Classification Search

CPC .......... H04R 7/08; H04R 17/00; H04R 19/02; H04R 2217/03

See application file for complete search history.

(56) References Cited

U.S. PATENT DOCUMENTS

| | | | | |
|---|---|---|---|---|
| 7,536,019 | B2 | 5/2009 | Putti et al. | |
| 8,861,752 | B2 | 10/2014 | Margalit | |
| 11,743,650 | B2 * | 8/2023 | Margalit | H04R 7/08 381/1 |
| 2007/0154039 | A1 | 7/2007 | Kim | |
| 2011/0026729 | A1 | 2/2011 | Nakayama | |
| 2014/0037126 | A1 | 2/2014 | Pinkerton | |
| 2019/0342654 | A1 | 11/2019 | Buckland | |

* cited by examiner

*Primary Examiner* — Mark Fischer

(74) *Attorney, Agent, or Firm* — Manelli Selter PLLC; Edward Stemberger

(57) ABSTRACT

A speaker array includes a first speaker device having a first membrane and a first acoustic channel, the first membrane being configured to oscillate and generate a first ultrasonic acoustic signal configured to be transmitted at least partially in the first acoustic channel, the first acoustic channel including at least one dimension comparable to a dimension of a viscous boundary layer of air. A second speaker device includes a second membrane and a second acoustic channel, the second membrane being configured to oscillate and generate a second ultrasonic acoustic signal configured to be transmitted at least partially in the second acoustic channel, the second acoustic channel including at least one dimension comparable to the dimension of the viscous boundary layer of air. An audio output of the speaker array is the combined output of at least the first speaker device and the second speaker device.

4 Claims, 7 Drawing Sheets

TECHNIQUES FOR GENERATING AUDIO SIGNALS

This application is a continuation of U.S. application Ser. No. 17/729,310, filed on Apr. 26, 2022, which is a continuation of U.S. application Ser. No. 17/060,277 filed on Oct. 1, 2020 which claims the benefit of U.S. Provisional Application No. 62/952,480 filed on Dec. 23, 2019.

TECHNICAL FIELD

The present disclosure generally relates to techniques for generating an audio signal and in some examples to methods and apparatuses for generating an audio signal on mobile devices.

BACKGROUND OF THE DISCLOSURE

Parametric audio systems, described for example in U.S. Pat. No. 7,391,872, employ arrays of acoustic transducers for projecting ultrasonic carrier signals modulated with audio signals through the air for subsequent regeneration of the audio signals along a path of projection. These systems require high power ultrasound signals and generate spatially localized audio beams. U.S. Pat. No. 8,861,752 is an example of a unique audio generating device in which an ultrasonic carrier signal modulated with audio signals is demodulated by an acoustic modulator to regenerate the audio signal. The audio generating device described in U.S. Pat. No. 8,861,752 has superior characteristics in terms of the ability to generate high power audio signal from minimal device volume, and a flat audio spectral response. It is desirable to simplify the operation of the audio generating device using parametric operation, while maintaining its compact form factor.

GLOSSARY

- "audio signals" as used in the current disclosure means sound pressure waves ranging from 10 Hz to 45,000 Hz.
- "audio generating device"—as used in the current disclosure means a device to generate audio signals.
- "acoustic signal" as used in the current disclosure means sound pressure waves ranging from 10 Hz to 1 MHz.
- "acoustic transducer" as used in the current disclosure means a device to generate acoustic signals.
- "controller" or "electronics integrated circuit"—as used in the current disclosure means a device that receives and outputs analog or digital electrical signals and includes logic or microprocessor units to process the input or output signals
- "drive signal"—as used in the current disclosure means an electric analog signal. One or more of the drive signals are used to operate an audio generating device
- "analog signal"—as used in the current disclosure means a time varying electric analog signal which can have any voltage or current value within a range of values
- "digital signal"—as used in the current disclosure means a time varying electric digital signal which can have either of two voltage or current values.
- "audio system" as used in the current disclosure means a system for generating audio signals and in some examples includes one or more audio generating devices and one or more controllers

SUMMARY

Some embodiments of the present disclosure may generally relate to a speaker device that includes a membrane and an acoustic channel. The membrane is configured to oscillate and generate an ultrasonic acoustic signal which is transmitted at least partially in the acoustic channel. The acoustic channel has at least one dimension comparable to the dimension of the viscous boundary layer of air. The acoustic flow in the acoustic channel experienced pronounced nonlinear flow due to the at least one dimension which is comparable to the dimension of the viscous boundary layer. The nonlinear flow self modulates the ultrasonic acoustic signal and generates an audio signal.

Other embodiments of the present disclosure may generally relate to a speaker array. The speaker array may include a first speaker device and a second speaker device. A first speaker device includes a first membrane and a first acoustic channel. The first membrane is configured to oscillate and generate a first ultrasonic acoustic signal which is transmitted at least partially in the first acoustic channel. The first acoustic channel has at least one dimension comparable to the dimension of the viscous boundary layer of air. The acoustic flow in the first acoustic channel experiences pronounced nonlinear flow due to the at least one dimension which is comparable to the dimension of the viscous boundary layer. The nonlinear flow self modulates the first ultrasonic acoustic signal and generates a first audio signal. A second speaker device includes a second membrane and a second acoustic channel. The second membrane is configured to oscillate and generate a second ultrasonic acoustic signal which is transmitted at least partially in the second acoustic channel. The second acoustic channel has at least one dimension comparable to the dimension of the viscous boundary layer of air. The acoustic flow in the second acoustic channel experiences pronounced nonlinear flow due to the at least one dimension which is comparable to the dimension of the viscous boundary layer. The nonlinear flow self modulates the second ultrasonic acoustic signal and generates a second audio signal. The audio output of the speaker array is the combined output of at least a first speaker device and a second speaker device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

DETAILED DESCRIPTION

Figure 1A:
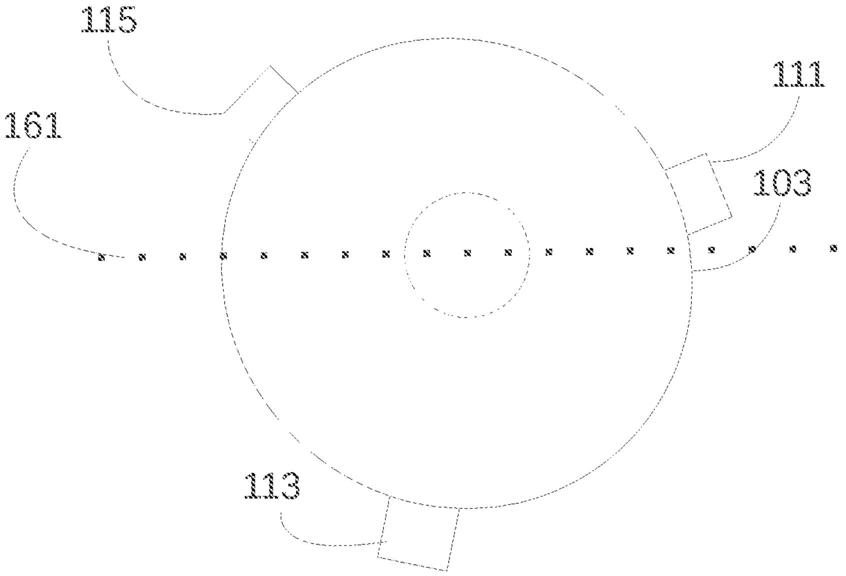
FIG. 1A is a cross sectional view of an illustrative embodiment of a speaker.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, computer programs, and systems of generating an audio signal.

Some embodiments of the present disclosure may generally relate to a speaker device that includes a membrane and an acoustic channel. The membrane is configured to oscillate and generate an ultrasonic acoustic signal which is transmitted at least partially in the acoustic channel. The acoustic channel has at least one dimension comparable to the dimension of the viscous boundary layer of air. The acoustic flow in the acoustic channel experienced pronounced nonlinear flow due to the at least one dimension which is comparable to the dimension of the viscous boundary layer of air. The nonlinear flow self modulates the ultrasonic acoustic signal and generates an audio signal.

Other embodiments of the present disclosure may generally relate to a speaker array. The speaker array may include a first speaker device and a second speaker device. A first speaker device includes a first membrane and a first acoustic channel. The first membrane is configured to oscillate and generate a first ultrasonic acoustic signal which is transmitted at least partially in the first acoustic channel. The first acoustic channel has at least one dimension comparable to the dimension of the viscous boundary layer of air. The acoustic flow in the first acoustic channel experiences pronounced nonlinear flow due to the at least one dimension which is comparable to the dimension of the viscous boundary layer. The nonlinear flow self modulates the first ultrasonic acoustic signal and generates a first audio signal. A second speaker device includes a second membrane and a second acoustic channel. The second membrane is configured to oscillate and generate a second ultrasonic acoustic signal which is transmitted at least partially in the second acoustic channel. The second acoustic channel has at least one dimension comparable to the dimension of the viscous boundary layer of air. The acoustic flow in the second acoustic channel experiences pronounced nonlinear flow due to the at least one dimension which is comparable to the dimension of the viscous boundary layer. The nonlinear flow self modulates the second ultrasonic acoustic signal and generates a second audio signal. The audio output of the speaker array is the combined output of at least a first speaker device and a second speaker device.

Figure 1B:
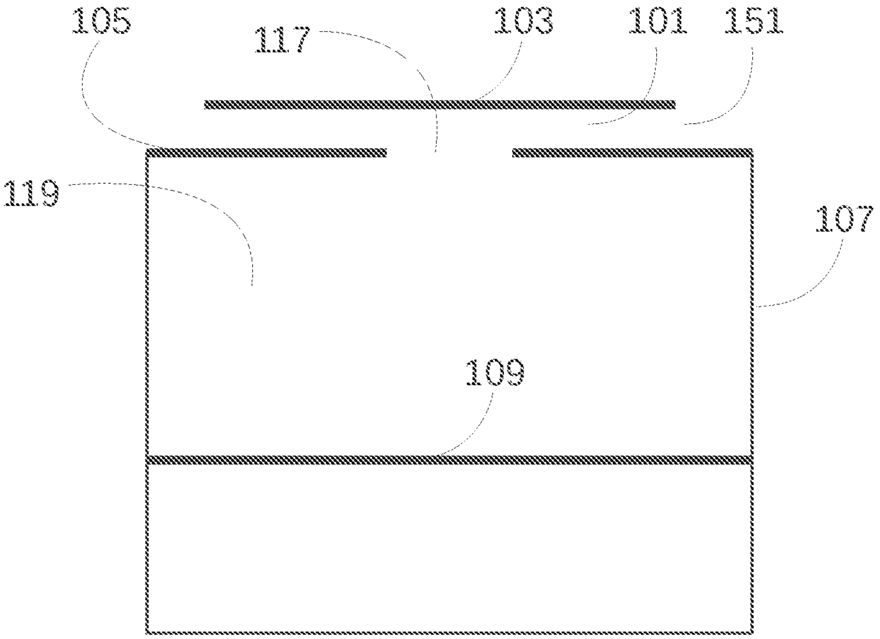
FIG. 1B is a perspective view of an illustrative embodiment of a speaker.

FIG. 1A is a top view and FIG. 1B is a cross sectional view at line 161 of an illustrative embodiment of speaker device 107 arranged in accordance with at least some embodiments of the present disclosure. Speaker device 107 includes acoustic channel 101, acoustic channel enclosure 103, 105, membrane 109, acoustic channel enclosure struts 111, 113, 115, acoustic cavity 119 containing at least membrane 109 and coupling aperture 117 connecting between acoustic channel and acoustic cavity. In one example speaker device 107 is a micro electromechanical system (MEMS) and has typical membrane radius between 50 to 300 micron and resonance frequencies ranging from 50 Khz to 1,000 KHz. In an alternative example the speaker device comprises of piezoelectric unimorphs or bimorphs, voice coil membranes or other membranes with radii between 0.5 to 20 mm and resonance frequencies ranging from 15 KHz to 100 KHz.

Acoustic waves are the propagation of small linear fluctuations in pressure on top of a background stationary (atmospheric) pressure. The governing equations for the fluctuations, also termed the wave equation or Helmholtz's equation, are derived by perturbing, the fundamental governing equations of fluid mechanics, including the Navier-Stokes equations, momentum equation, continuity equation, and energy equation. This results in the conservation equations for momentum, mass, and energy for any small acoustic perturbation. For many acoustics simulation applications, a series of assumptions are then made to simplify these equations. The system is assumed lossless and isentropic. However retention of both the viscous and heat conduction effects, results in equations for thermoviscous acoustics that solve for the acoustic perturbations in pressure, velocity, and temperature. The characteristic length of the viscous and thermal boundary layers are given by $$\delta_{visc} = \sqrt{\frac{2\mu}{\omega\rho_0}}$$

$$\delta_{therm} = \sqrt{\frac{2k}{\omega\rho_0 C_p}}$$

Where $\rho_0$ is the background density; $\mu$ is the dynamic viscosity; $\omega$ is the angular frequency; Cp the heat capacity and k thermal conductivity. The acoustic channel has at least one dimension which is comparable to either the viscous boundary layer dimension $\delta_{visc}$ or thermal boundary layer dimension $\delta_{therm}$. In another example the acoustic channel has at least one dimension which is smaller than 5 times $\delta_{visc}$, or 5 times $\delta_{therm}$. In another example the acoustic channel has at least one dimension which is smaller than 10 times $\delta_{visc}$, or 10 times $\delta_{therm}$. The acoustic channel height is the distance between acoustic channel enclosures 105, 103. The acoustic channel width is the distance from the edge of the coupling aperture 117 and the opening of the acoustic channel 151. In an alternative example the acoustic channel width is 1 to 5 times the acoustic channel height and the acoustic channel height is smaller than any of the following; 5 times $\delta_{visc}$; 5 times $\delta_{therm}$; 10 times $\delta_{visc}$; 10 times $\delta_{therm}$.

In one example the speaker device is operated by actuating the membrane 109 to move and generate an acoustic signal. The acoustic signal is coupled through the coupling aperture into the acoustic channel. Due to the at least one dimension of the acoustic channel which is comparable to the viscous boundary layer dimension $\delta_{visc}$ or thermal boundary layer dimension $\delta_{therm}$, the acoustic flow through the channel is highly nonlinear. The nonlinear flow self modulates the acoustic beam and generates an acoustic signal proportional to $|A|^2$ where is A the acoustic signal. This results contrasts with a parametric speaker where the self-modulation is proportional to the second derivative of the acoustic signal A.

Figure 1C:
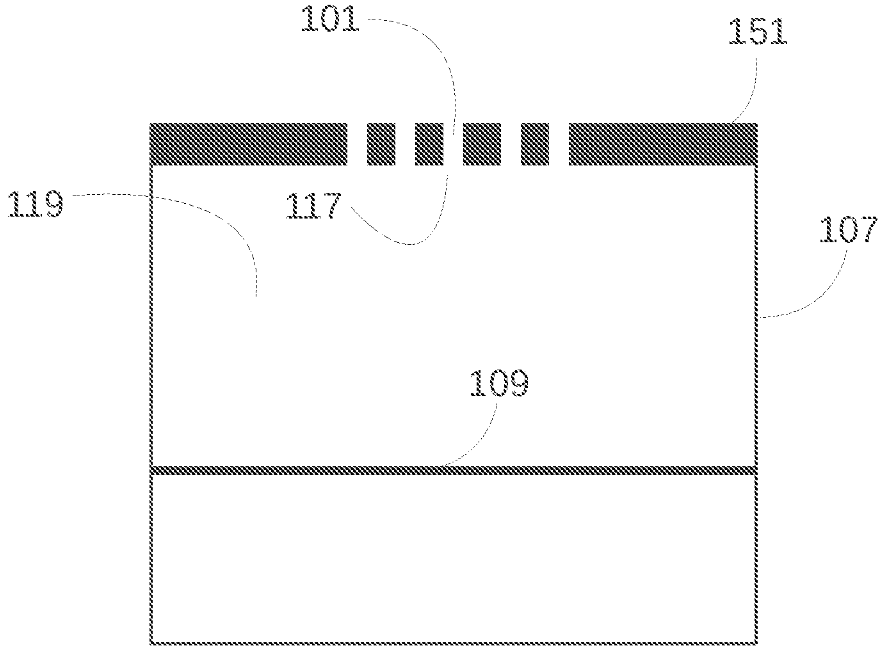
FIG. 1C is another perspective view of an illustrative embodiment of a speaker.

FIG. 1C is an alternative example of a cross sectional view of an alternative embodiment of speaker device 107 arranged in accordance with at least some embodiments of the present disclosure. In FIG. 1C, a speaker device 107, includes but is not limited to a membrane 109; acoustic cavity 119; acoustic coupling layer 151 and one or more acoustic channels 101. FIG. 1C is a generalization of FIG. 1B where the acoustic channel enclosure 103, 105 are realized in an acoustic coupling layer. The acoustic coupling layer thickness is analogous to the acoustic channel width. The acoustic channel lateral dimensions which define the cross section of the acoustic channel are denoted as a and b. Either a or b are analogous to the acoustic channel height as described in the previous example. Hence in one example the acoustic channel width is 1 to 5 times any of the acoustic channel height; a; b. The acoustic channel layer thickness is 1 to 5 times any of the acoustic channel height; a; b. In one example acoustic channel height and/or a and/or b are comparable to either the viscous boundary layer dimension $\delta_{visc}$ or thermal boundary layer dimension $\delta_{therm}$. In another example the acoustic channel height and/or a and/or b are smaller than 5 times $\delta_{visc}$, or 5 times $\delta_{therm}$. In another example acoustic channel height and/or a and/or b are smaller than 10 times $\delta_{visc}$, or 10 times $\delta_{therm}$. In a further example any of acoustic channel height; a; b are smaller any off 5 micron; 10 micron; 20 micron.

Figure 2A:
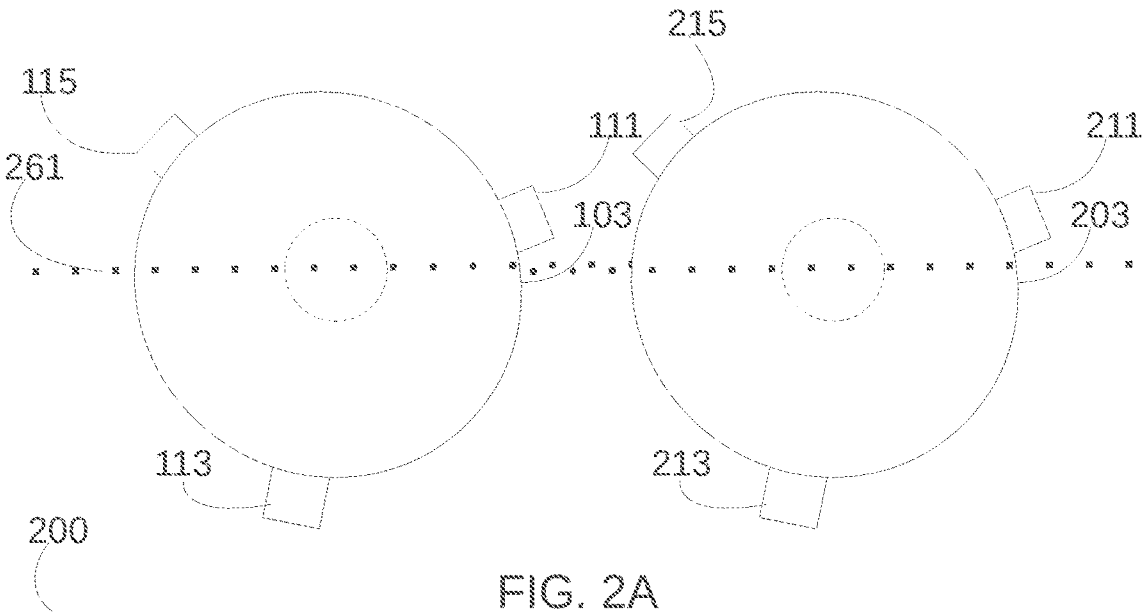
FIG. 2A is a top view of an illustrative embodiment of a speaker array.
Figure 2B:
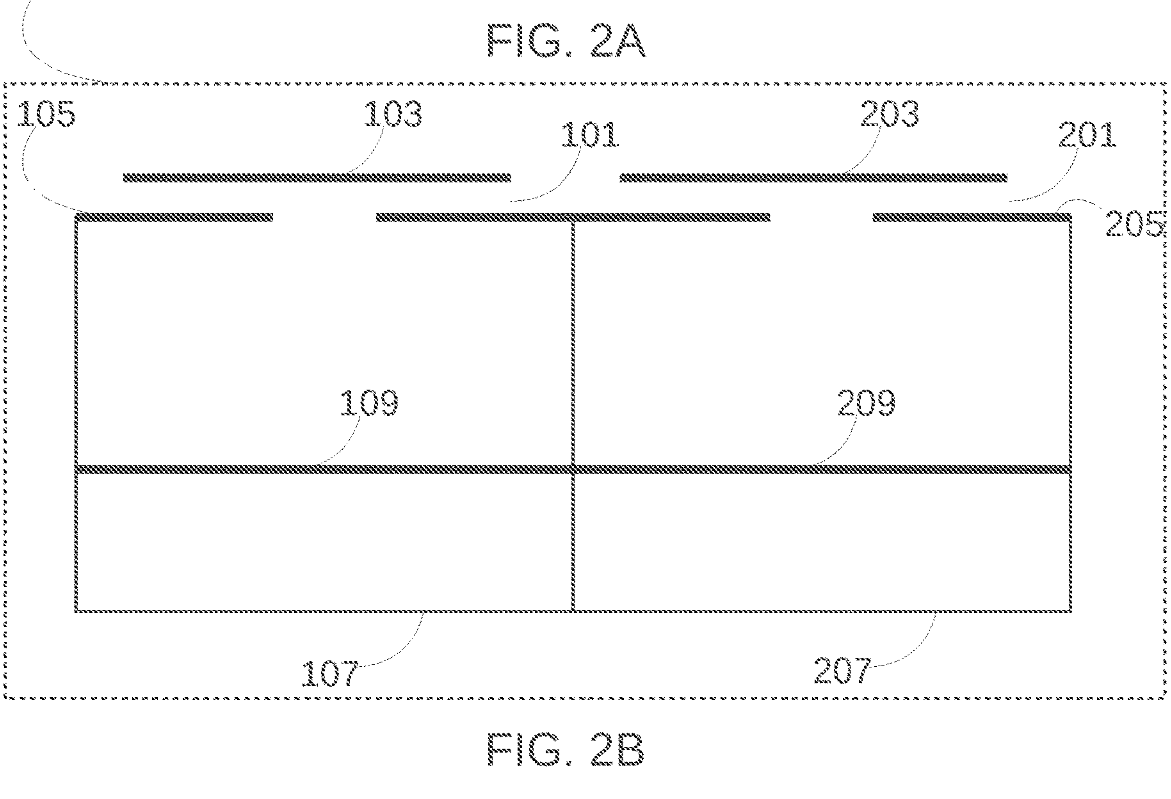
FIG. 2B is a cross sectional view of the illustrative embodiment of the speaker of FIG. 2A.

FIG. 2A is a top view and FIG. 2B is a cross sectional view at line 261 of an illustrative embodiment of speaker array 200 arranged in accordance with at least some embodiments of the present disclosure. Speaker array 200 can include a first speaker device 107 and a second speaker device 207. Speaker device 107 includes acoustic channel 101, acoustic channel enclosure 103, 105, membrane 109, acoustic channel enclosure struts 111, 113, 115, acoustic cavity 119 containing at least membrane 109 and coupling aperture 117 connecting between acoustic channel and acoustic cavity. In one example speaker device 107 is a micro electromechanical system (MEMS) and has typical membrane radius between 50 to 300 micron and resonance frequencies ranging from 50 Khz to 1,000 KHz. In an alternative example the speaker device comprises of piezoelectric unimorphs or bimorphs, voice coil membranes or other membranes with radii between 0.5 to 20 mm and resonance frequencies ranging from 15 KHz to 100 KHz. Speaker device 207 includes acoustic channel 201, acoustic channel enclosure 203, 205, membrane 209, acoustic channel enclosure struts 211, 213, 215, acoustic cavity 219 containing at least membrane 209 and coupling aperture 217 connecting between acoustic channel and acoustic cavity. In one example speaker device 207 is a micro electromechanical system (MEMS) and has typical membrane radius between 50 to 300 micron and resonance frequencies ranging from 50 Khz to 1,000 KHz. In an alternative example the speaker device 207 comprises of piezoelectric unimorphs or bimorphs, voice coil membranes or other membranes with radii between 0.5 to 20 mm and resonance frequencies ranging from 15 KHz to 100 KHz. Speaker devices 107, 207 are operated to generate one or more audio signals.

Figure 3:
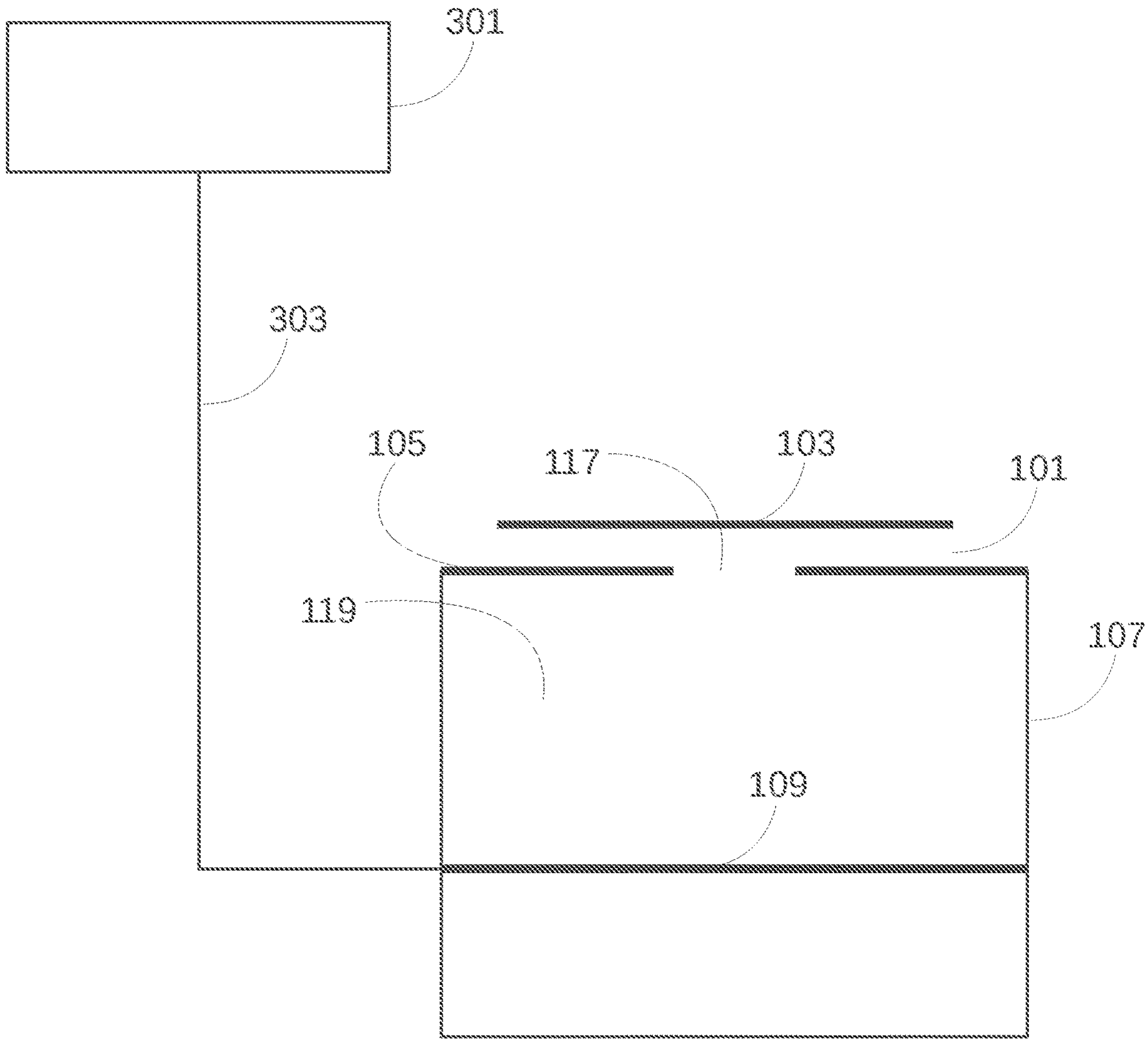
FIG. 3 is a flow chart of an illustrative embodiment of a method for generating an audio signal.

FIG. 3 is an example of a speaker device 107 and driver 301. The driver provides electrical signal to operate the membrane 109 in accordance with the teachings of this disclosure. Examples of drivers 301 include but are not limited to; amplifiers; FPGA; ASICs; integrated circuits; transistors; FETs; charge pumps; transformers. A driver 301 is connected to a speaker device or speaker device array as described in FIG. 2. Alternatively a driver is connected to a plurality of speaker devices 107 or speaker arrays. The connection 303 is any of but not limited to; single electrical wire; double electrical wire; coaxial cable; PCB laminate with conductive patterns; wirebond; other electrical connections. Depending on membrane type the driving is any of; voltage; current; power; frequency; duty cycle of signal.

The role of the acoustic channel is to self-modulate the acoustic signal. The phenomena of nonlinear acoustic impedance in perforated sheets have been demonstrated in the art. The nonlinear acoustic impedance occurs since the flow regime creates a situation where there is a nonlinear relationship between the pressure and particle velocity. This is typical of an acoustic flow in the channel is governed by either the viscous acoustic equations or thermal acoustic equations or in general the thermos-acoustic equations. As a result the modulation of the amplitude and/or the phase of acoustic signal are proportional to the acoustic signal amplitude. An acoustic signal s(t) is characterized as:

$$s(t)=Cd(t)\cos(2\pi*\Omega t) \quad (1)$$

With C an amplitude constant, d(t) a source signal and Ω a carrier frequency of the source signal. Applying a Fourier transform to Equation (1) results in a frequency domain representation;

$$S(f)=C/2*[D(f-\Omega)+D(f+\Omega)] \quad (2)$$

Where D(f) is the spectrum of the source signal. Equation (2) describes a signal with an upper and lower side band around a carrier frequency of Ω. The passage of the acoustic signal through the acoustic channel results in phase or amplitude modulation or both;

$$s(t)=s(t)m_1(s)\exp\{j2\pi m_2(s)\} \quad (3)$$

where $m_1(s)$ is an amplitude modulation function and $m_2(s)$ is a phase modulation function. While these functions can have an arbitrary form, expansion in a Taylor series and taking the first order linear expansion in s results in $$s(t)=s(t)\,(1-m_1s(t))\,(1+j\,m_2s(t)) \quad (4)$$

focusing on $s^2(t)$ which results in an audio component due to the frequency difference component, we obtain an audio signal which is proportional to $$a(t)\sim Cm_1d^2(t)+jCm_2d^2(t) \quad (5)$$

So to generate a target audio signal a(t), the source signal is given by $$d(t)=(a(t))^{1/2} \quad (6)$$

with C, defined by the required volume. Since $(a(t))^{1/2}$ is unbounded in frequency, it is beneficial to use a bandwidth limited upper side band of s(t) as the driving signal. A bandwidth limited, upper side band of s(t) is obtained by a combination of linear filtering to limit the bandwidth, using a Hilbert transformer to obtain the single side band signal. In one example the carrier frequency is any of but not limited to 20-30 KHz; 30-40 KHz; less than 50 KHz; less than 100 KHz. A higher frequency results in a smaller viscous or thermal dimension and requires a correspondingly smaller at least one dimension of the acoustic channel. In a further example an acoustic cavity FIG. 1 119 amplifies the pressure of acoustic signal. It is further known in the art that smaller cavities enhance the peak pressures of an acoustic signal and hence the acoustic signal in the acoustic cavity FIG. 1 119 is significantly larger than the peak signal of a freely propagating acoustic signal. Typical SPL in the cavity are more than any of but not limited to 100 dB; 110 dB; 120 dB; 130 dB; 140 dB. As a result the nonlinear action of the one or more acoustic channel is more pronounced and the efficiency of conversion of the ultrasound signal to an audio signal is larger.

Figure 4:
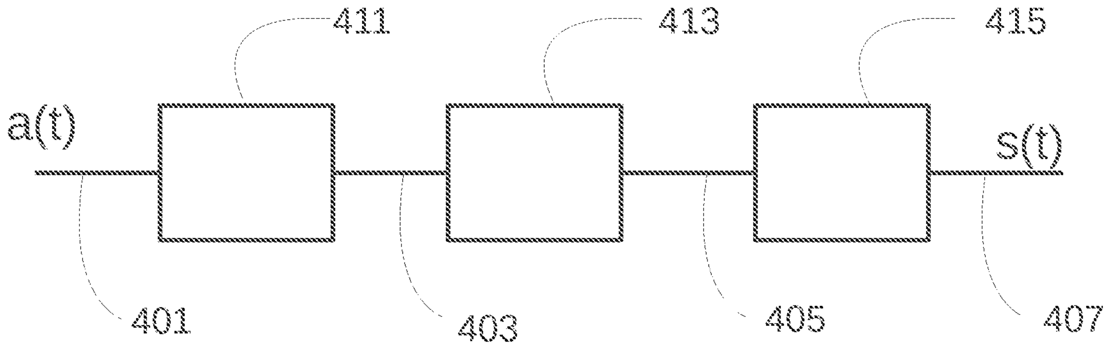
FIG. 4 shows a block diagram illustrating a computer program product that is arranged for generating an audio signal.

FIG. 4 is an example of a system for generating a drive signal s(t) from a desired electronic audio signal a(t). An audio signal a(t) is received at the drive unit FIG. 3 301. The audio signal a(t) is any of but not limited to; a digital audio signal; a time sampled digital audio signal; an analog audio signal; a frequency converted analog signal; a digital signal with an embedded digital portion which includes a(t) or partial samples of it; an encoded digital or analog signal; a wireless signal containing a digital or analog signal; I2S signal; I2C signal; CAN bus signal or any combinations of these. The audio signal a(t) is extracted and processed according to control signals which are also received by the drive unit. Examples of control signals include but are not limited to; delay; sound volume; timber; treble; bass; frequency specific amplification or spectral manipulation; reverberation; echo; distortion or any other sound effects. In block 411 the audio signal a(t) is converted into a single side band signal through a Hilbert transform. In block 413 the signal is further processed in either the time or frequency domains. In block 415, the square root of the resulting signal is generated. In one example the square root is done in the digital domain by any of but not limited to; digital signal processor; processor; graphic processor; ASIC; FPGA; System on chip; or combinations of these. In an alternative example the square root is obtained by an analog circuit such as combinations of logarithmic amplifiers. The resultant signal s(t) is used to drive the membrane. Examples of drive mechanisms include but are not limited to; amplifying the signal s(t); using the signal s(t) to drive a pulse width modulation scheme. The system described in FIG. 4 is realized in any of but not limited to; digital domain; analog domain; combinations of analog and digital domains. In an example where FIG. 4 is realized in the digital domain; signal a(t) is a sampled digital signal such as a(n) with n discrete samples taken at sampling interval. The digital signal is received directly from the control signal. In an alternative example; the signal is sampled by the drive unit FIG. 3 301.

In summary, the disclosure describes in one example a speaker device composed of a membrane configured to oscillate and generate an acoustic signal; one or more acoustic channels wherein at least one dimension of an acoustic channel is on the order of dimension of the viscous boundary layer of air; and wherein the traversal of the ultrasonic acoustic signal through an acoustic channel generates an audio signal. In a further example speaker device composed of a membrane and acoustic channel is an individual speaker from a plurality of speakers in the speaker device. In an alternative example a method for generating an audio signal which includes; selectively oscillating a membrane located in a first plane along a first directional path to generate an acoustic signal; and wherein the acoustic signal traverses an acoustic channel with least one dimension on the order of dimension of the viscous boundary layer of air and generates an audio signal. In an alternative example a speaker array including at least but not limited to; a first speaker device, comprising a first membrane configured to oscillate and generate a first acoustic signal; one or more acoustic channels wherein at least one dimension of an acoustic channel is on the order of dimension of the viscous boundary layer of air; and wherein the traversal of the first ultrasonic acoustic signal through an acoustic channel generates a first audio signal; and a second speaker device, comprising; a second membrane configured to oscillate and generate a second acoustic signal; one or more acoustic channels wherein at least one dimension of an acoustic channel is on the order of dimension of the viscous boundary layer of air; and wherein the traversal of the second ultrasonic acoustic signal through an acoustic channel generates a second audio signal. In an alternative example a speaker device, comprising: a membrane; an acoustic cavity; wherein the membrane is configured to oscillate and generate an acoustic signal in the acoustic cavity; one or more acoustic channels in acoustic contact with the acoustic cavity wherein at least one dimension of an acoustic channel is on the order of dimension of the viscous boundary layer of air; and wherein the traversal of the acoustic signal through an acoustic channel generates an audio signal. In a further example a method for generating an audio signal, comprising: selectively oscillating a membrane located in a first plane along a first directional path to generate an acoustic signal; and wherein the acoustic signal is amplified in an acoustic cavity and traverses an acoustic channel with least one dimension on the order of dimension of the viscous boundary layer of air to generates an audio signal.

The disclosure further describes a speaker device which includes; a membrane configured to oscillate and generate an acoustic signal; one or more acoustic channels with at least an input and output port; wherein at least one dimension of an acoustic channel is on the order of dimension of the viscous boundary layer of air and at least a portion of the generated acoustic signal is coupled into an input port of an acoustic channel. The acoustic signal at the output port of an acoustic channel includes an audio signal. In a further example the speaker device is an individual speaker from a plurality of speakers in the speaker device. In a further example a membrane is manufactured from any the following materials including but not limited to; metal layers; Aluminum; Silicon; poly Silicon; Silicon Nitride; Nickel; Copper; Ceramic Aluminum Nitride; Molybdenum; Carbon; Graphene; Polymer; PZT; PVDF; or any combination which includes any of these materials. In a further example a membrane is actuated by any of the following but not limited to electrostatic force; piezo electric force; electromagnetic force. In a further example an acoustic channel is fabricated from any of the following but not limited to Silicon; Silicon Oxide; Polymer; Polyamide; Nickel; Copper; Aluminum; Metal; Ceramic; Glass or any combination which includes any of these materials. In an alternative example we describe a method for generating an audio signal which includes, selectively oscillating a membrane located in a first plane along a first directional path to generate an acoustic signal which traverses an acoustic channel with least one dimension on the order of dimension of the viscous boundary layer of air to generates an audio signal. In a further example a membrane is manufactured from any the following materials including but not limited to; metal layers; Aluminum; Silicon; poly Silicon; Silicon Nitride; Nickel; Copper; Ceramic Aluminum Nitride; Molybdenum; Carbon; Graphene; Polymer; PZT; PVDF; or any combination which includes any of these materials. In a further example a membrane is actuated by any of the following but not limited to electrostatic force;

piezo electric force; electromagnetic force. In a further example an acoustic channel is fabricated from any of the following but not limited to Silicon; Silicon Oxide; Polymer; Polyamide; Nickel; Copper; Aluminum; Metal; Ceramic; Glass or any combination which includes any of these materials. In an alternative example a speaker array which includes at least a first membrane configured to oscillate and generate a first acoustic signal and one or more acoustic channels with at least an input and output port and at least one dimension of an acoustic channel is on the order of dimension of the viscous boundary layer of air. A portion of the generated first acoustic signal is coupled into an input port of an acoustic channel, and the acoustic signal at the output port of an acoustic channel includes a first audio signal. A second membrane configured to oscillate and generate a second acoustic signal and one or more acoustic channels with at least an input and output port and at least one dimension of an acoustic channel is on the order of dimension of the viscous boundary layer of air. A portion of the generated second acoustic signal is coupled into an input port of an acoustic channel, and the acoustic signal at the output port of an acoustic channel includes a second audio signal. In a further example a membrane is manufactured from any the following materials including but not limited to; metal layers; Aluminum; Silicon; poly Silicon; Silicon Nitride; Nickel; Copper; Ceramic Aluminum Nitride; Molybdenum; Carbon; Graphene; Polymer; PZT; PVDF; or any combination which includes any of these materials. In a further example a membrane is actuated by any of the following but not limited to electrostatic force; piezo electric force; electromagnetic force. In a further example an acoustic channel is fabricated from any of the following but not limited to Silicon; Silicon Oxide; Polymer; Polyamide; Nickel; Copper; Aluminum; Metal; Ceramic; Glass or any combination which includes any of these materials. In an additional example a speaker device which includes a membrane, an acoustic cavity, and the membrane is configured to oscillate and generate an acoustic signal in the acoustic cavity. One or more acoustic channels with an input and output port. An input port is acoustically coupled with an acoustic cavity and at least one dimension of an acoustic channel is on the order of dimension of the viscous boundary layer of air. The acoustic signal at the output port of the acoustic signal includes an audio signal. In a further example a membrane is manufactured from any the following materials including but not limited to; metal layers; Aluminum; Silicon; poly Silicon; Silicon Nitride; Nickel; Copper; Ceramic Aluminum Nitride; Molybdenum; Carbon; Graphene; Polymer; PZT; PVDF; or any combination which includes any of these materials. In a further example a membrane is actuated by any of the following but not limited to electrostatic force; piezo electric force; electromagnetic force. In a further example an acoustic channel is fabricated from any of the following but not limited to Silicon; Silicon Oxide; Polymer; Polyamide; Nickel; Copper; Aluminum; Metal; Ceramic; Glass or any combination which includes any of these materials. In an alternative example a method for generating an audio signal which includes selectively oscillating a membrane located in a first plane along a first directional path to generate an acoustic signal in an acoustic cavity and traverses an acoustic channel with least one dimension on the order of dimension of the viscous boundary layer of air to generate an audio signal. In a further example a membrane is manufactured from any the following materials including but not limited to; metal layers; Aluminum; Silicon; poly Silicon; Silicon Nitride; Nickel; Copper; Ceramic Aluminum Nitride; Molybdenum; Carbon; Graphene; Polymer; PZT; PVDF; or any combination which includes any of these materials. In a further example a membrane is actuated by any of the following but not limited to electrostatic force; piezo electric force; electromagnetic force. In a further example an acoustic channel is fabricated from any of the following but not limited to Silicon; Silicon Oxide; Polymer; Polyamide; Nickel; Copper; Aluminum; Metal; Ceramic; Glass or any combination which includes any of these materials.

In some implementations, the digital implementation may encompass non-transitory computer readable medium, such as, but not limited to, a hard disk drive, a Compact Disc (CD), a Digital Versatile Disk (DVD), a digital tape, memory, etc. In some implementations, the digital implementation may encompass recordable medium, such as, but not limited to, memory, read/write (R/W) CDs, R/W DVDs, etc. In some implementations, the digital implementation may encompass communications medium, such as, but not limited to, a digital and/or an analog communication medium (e.g., a fiber optic cable, a waveguide, a wired communications link, a wireless communication link, etc.) the digital implementation may also be recorded in non-transitory computer readable medium or another similar recordable medium.

Figure 5:
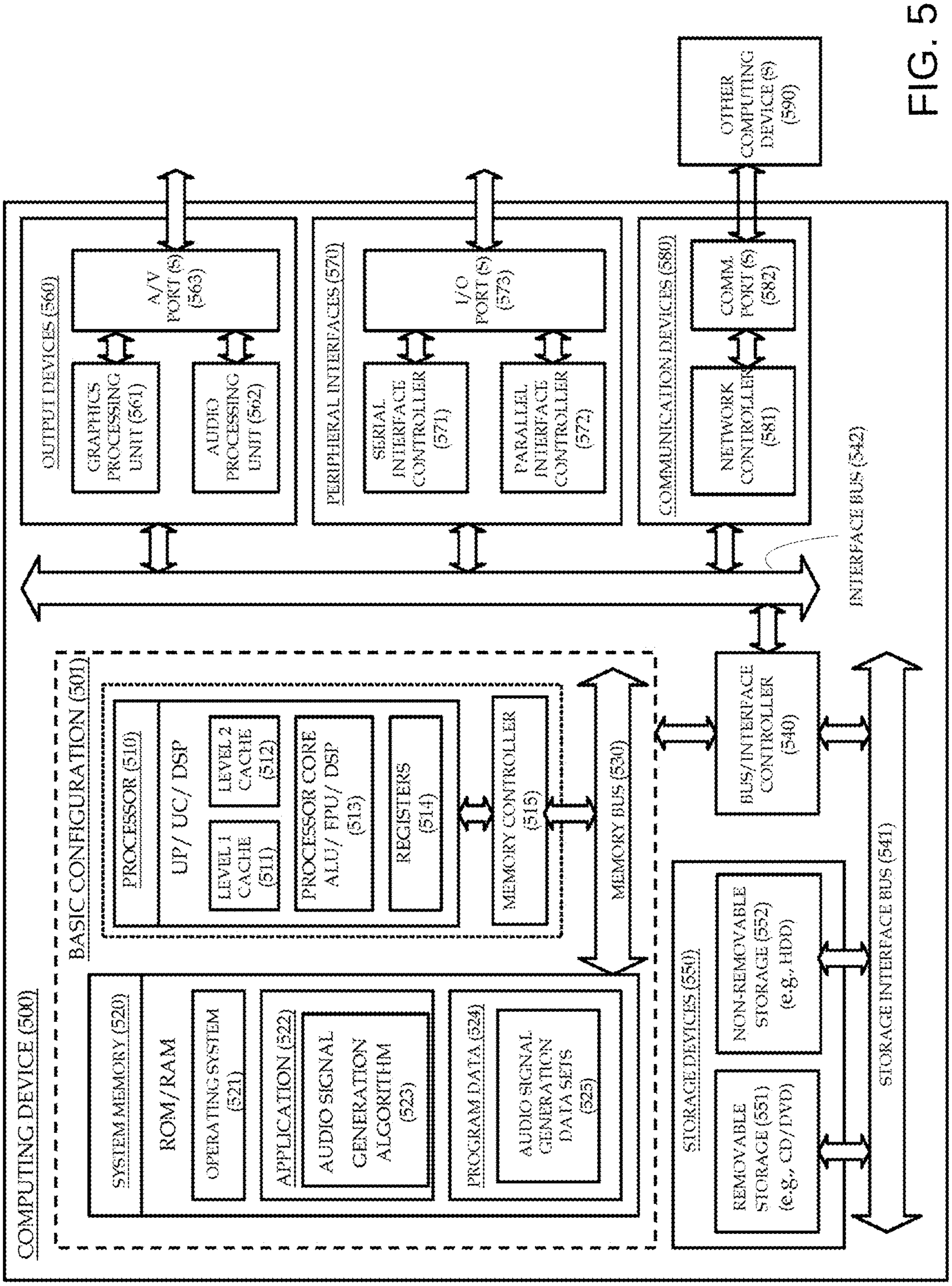
FIG. 5 shows a block diagram of an illustrative embodiment of a computing device that is arranged for generating an audio signal, all arranged in accordance with at least some embodiments of the present disclosure.

FIG. 5 shows a block diagram of an illustrative embodiment of a computing device that is arranged for generating an audio signal in accordance with at least some embodiments of the present disclosure. In a very basic configuration 501, computing device 500 typically includes one or more processors 510 and a system memory 520. A memory bus 530 may be used for communicating between processor 510 and system memory 520.

Depending on the desired configuration, processor 510 may be of any type including but not limited to a microprocessor (μP), a microcontroller (μC), a digital signal processor (DSP), or any combination thereof. Processor 510 may include one more levels of caching, such as a level one cache 511 and a level two cache 512, a processor core 513, and registers 514. An example processor core 513 may include an arithmetic logic unit (ALU), a floating point unit (FPU), a digital signal processing core (DSP Core), or any combination thereof. An example memory controller 515 may also be used with processor 510, or in some implementations memory controller 515 may be an internal part of processor 510.

Depending on the desired configuration, system memory 520 may be of any type including but not limited to volatile memory (such as RAM), non-volatile memory (such as ROM, flash memory, etc.) or any combination thereof. System memory 520 may include an operating system 521, one or more applications 522, and program data 524. In some embodiments, application 522 may include an audio signal generation algorithm 523 that is arranged to perform the functions as described herein including those described with respect to the steps 301 and 303 of the method 300 of FIG. 3. Program data 524 may include audio signal generation data sets 525 that may be useful for the operation of audio signal generation algorithm 523 as will be further described below. In some embodiments, the audio signal generation data sets 525 may include, without limitation, a first signal level and a second signal level which oscillates the membrane and moves the shutter, respectively. In some embodiments, application 522 may be arranged to operate with program data 524 on operating system 521 such that implementations of selecting preferred data set may be provided as described herein. This described basic configuration 501 is illustrated in FIG. 5 by those components within the inner dashed line.

In some other embodiments, application 522 may include audio signal generation algorithm 523 that is arranged to perform the functions as described herein including those described with respect to the steps 301 and 303 of the method 300 of FIG. 3.

Computing device 500 may have additional features or functionality, and additional interfaces to facilitate communications between basic configuration 501 and any required devices and interfaces. For example, a bus/interface controller 540 may be used to facilitate communications between basic configuration 501 and one or more data storage devices 550 via a storage interface bus 541. Data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage devices 551 and non-removable storage devices 552 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 542 for facilitating communication from various interface devices (e.g., output devices 560, peripheral interfaces 570, and communication devices 580) to basic configuration 501 via bus/interface controller 540. Example output devices 560 include a graphics processing unit 561 and an audio processing unit 562, which may be configured to communicate to various external devices such as a display or speakers via one or more A/V ports 563. Example peripheral interfaces 570 include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which may be arranged to facilitate communications with one or more other computing devices 590 over a network communication link via one or more communication ports 582. In some embodiments, the other computing devices 590 may include other applications, which may be operated based on the results of the application 522.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A speaker array comprising:

a first speaker device comprising a first membrane and a first acoustic channel, the first membrane being configured to oscillate and generate a first ultrasonic acoustic signal configured to be transmitted at least partially in the first acoustic channel, the first acoustic channel including at least one dimension comparable to a dimension of a viscous boundary layer of air such that acoustic flow through the first acoustic channel is nonlinear, and a second speaker device comprising a second membrane and a second acoustic channel, the second membrane being configured to oscillate and generate a second ultrasonic acoustic signal configured to be transmitted at least partially in the second acoustic channel, the second acoustic channel including at least one dimension comparable to the dimension of the viscous boundary layer of air such that acoustic flow through the second acoustic channel is nonlinear, wherein an audio output of the speaker array is the combined output of at least the first speaker device and the second speaker device.

2. The speaker array of claim 1, wherein each of the first and second membranes is comprised of any of the following; metal layers; Aluminum; Silicon; poly Silicon; Silicon Nitride; Nickel; Copper; Ceramic Aluminum Nitride; Molybdenum; Carbon; Graphene; Polymer; PZT; PVDF; or any combination which includes any of these materials.

3. The speaker array of claim 1, wherein each of the first and second membranes is configured to be actuated by any of the following; electrostatic force;

piezo electric force; electromagnetic force.

4. The speaker array of claim 1, wherein each of the first and second acoustic channels is comprised of any of the following; Silicon; Silicon Oxide; Polymer; Polyamide; Nickel; Copper; Aluminum; Metal; Ceramic; Glass or any combination which includes any of these materials.

* * * * *